US011125432B2

(12) United States Patent
Endebrock (10) Patent No.: US 11,125,432 B2
(45) Date of Patent: Sep. 21, 2021

(54) SOLID PARTICLE FUEL BURNER

(71) Applicant: Edward Norbert Endebrock, Lewiston, ID (US)

(72) Inventor: Edward Norbert Endebrock, Lewiston, ID (US)

(*) Notice: Subject to any disclaimer, the term of this patent is extended or adjusted under 35 U.S.C. 154(b) by 48 days.

(21) Appl. No.: 16/798,235

(22) Filed: Feb. 21, 2020

(65) Prior Publication Data

US 2020/0208837 A1 Jul. 2, 2020

Related U.S. Application Data

(63) Continuation of application No. 16/405,959, filed on May 7, 2019, now abandoned.

(60) Provisional application No. 62/679,001, filed on May 31, 2018.

(51) Int. Cl.
| | | |
|---|---|---|
| *F23K 3/14* | (2006.01) | |
| *F23B 40/04* | (2006.01) | |
| *F23B 30/06* | (2006.01) | |
| *F23L 7/00* | (2006.01) | |
| *F02G 1/043* | (2006.01) | |

(52) U.S. Cl.
CPC ............... *F23K 3/14* (2013.01); *F23B 30/06* (2013.01); *F23B 40/04* (2013.01); *F23L 7/007* (2013.01); *F02G 1/043* (2013.01); *F02G 2254/10* (2013.01); *F23B 2700/037* (2013.01); *F23K 2203/202* (2013.01)

(58) Field of Classification Search
CPC ....... F23B 40/04; F23K 3/14; F23K 2203/202
See application file for complete search history.

(56) References Cited

U.S. PATENT DOCUMENTS

| | | | | |
|---|---|---|---|---|
| 811,089 | A * | 1/1906 | Ricker ....................... | F23K 3/14 110/286 |
| 1,785,456 | A * | 12/1930 | Ousdahl .................... | F23K 3/14 110/101 R |
| 2,373,448 | A * | 4/1945 | Beers ........................ | F23K 3/14 110/283 |
| 2,396,888 | A * | 3/1946 | Scholl ....................... | F23K 3/14 110/288 |
| RE26,908 | E * | 5/1970 | Albertson et al. ........ | F23G 5/30 110/245 |
| 4,667,606 | A * | 5/1987 | Svärd ........................ | F23G 5/32 110/110 |
| 5,261,335 | A * | 11/1993 | Blevins, Jr. ............... | F23B 1/16 110/101 C |
| 6,273,009 | B1 * | 8/2001 | Magnusson ............. | F23B 30/04 110/346 |

(Continued)

FOREIGN PATENT DOCUMENTS

WO WO-0186208 A1 * 11/2001 ............. F23C 7/002

*Primary Examiner* — David J Laux (57) ABSTRACT

A burner for solid particle fuels such as shavings or pellets. The invention includes a helical piston to deliver fuel particles up an inclined tube into a cup having an oxygen delivery tube for combustion. The helical piston is axially extendable and retractable to first advance material up the tube without rotation, and then retract with rotation so as to screw itself into the next charge of material to be advanced. Combustion heat may be used to drive a Stirling engine or other mechanism for converting heat into other useful energy or power, such as using the burner as a component of a combined heat and power (CHP) system.

15 Claims, 3 Drawing Sheets

(56) References Cited

U.S. PATENT DOCUMENTS

| | | | |
|---|---|---|---|
| 8,097,090 B2* | 1/2012 | Freel | B08B 9/00 134/8 |
| 2013/0263764 A1* | 10/2013 | Letchford | F27D 21/00 110/110 |
| 2013/0269678 A1* | 10/2013 | Zhu | F24B 1/1915 126/501 |
| 2015/0020790 A1* | 1/2015 | Zhu | F23K 3/14 126/68 |
| 2015/0159879 A1* | 6/2015 | Zhu | F24B 5/026 126/73 |

* cited by examiner

SOLID PARTICLE FUEL BURNER

CROSS REFERENCE TO RELATED APPLICATION

This non-provisional utility application is a continuation in part of U.S. utility application Ser. No. 16/405,959 "Solid Particle Fuel Burner," filed 7 May 2019. The utility application Ser. No. 16/405,959 "Solid Particle Fuel Burner," filed 7 May 2019 claims the benefit of priority to U.S. Provisional Application 62/679,001 "Solid Particle Fuel Burner," filed May 31, 2018 and now expired.

The entire contents of U.S. Provisional Application 62/679,001 "Solid Particle Fuel Burner," filed May 31, 2018, and utility application Ser. No. 16/405,959 "Solid Particle Fuel Burner," filed 7 May 2019, are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to a burner for solid particle fuels such as shavings or pellets. The invention includes an oxygen feed and a piston to deliver fuel particles into a cup for combustion.

BACKGROUND

Burners for boilers, external combustion engines, and industrial heating are sometimes designed to consume solid fuel particles such as sawdust, wood chips, fuel pellets, pulverized coal, and other combustible materials. Recent developments have produced bulk fuels from various biomass sources including dead or dried plant matter, aquatic algae, dung, garbage, construction waste, wood or other shavings, shredded paper or plastic, bark, hog fuel, and sawdust from logging and lumber milling operations. Manufacture and compositions of fuel pellets, flakes or particles are outside the scope of the invention, compared to traditional fossil fuels, which use biomass rather than fossil fuels have other advantages including local economic development, waste reduction and the security of a domestic or a regional fuel supply.

Material handling of solid fuel particles such as flakes, shavings or pellets can be challenging especially when the material in bulk is uncompacted or "fluffy." Consistency in the range of particle size of a bulk solid fuel enables mechanical feed systems to operate at constant speeds and deliver substantially constant or consistent amounts of stored energy over given intervals of time, stabilizing the energy output generated for various industrial processes including boilers, incinerators, power generation, and industrial heating needs.

The challenge presented by high combustion temperature operations is that the physical materials of the machinery itself suffer from accelerated corrosion, erosion, creep, and fatigue compared to lower temperatures. Additional care and design expertise is required for assembly tolerances for close-fitting or mechanically connected or interoperable components subject to cycles of thermal expansions, deformations, and returns to ambient temperatures. Materials which can withstand high temperature service and stresses are often more expensive.

BRIEF SUMMARY

A primary objective of the invention is to provide a means of delivering solid fuel particles, flakes, or pellets from a bulk collector such as a hopper, tender, or a bunker to a combustion chamber or a receptacle in proximity to a flame, a heat source, or an ignition source.

Another objective of the invention is to deliver oxygen to a defined combustion zone to raise the combustion temperature and effect cleaner, more complete combustion. A corollary objective of the invention is to extract useful energy from low-grade or low energy density fuels.

Another corollary objective of the invention is to confine the highest material temperatures to the within the burning fuel mass itself and maintain the burner components at lower temperatures so that the burner components need not be made of exotic or expensive materials which are proof against high temperatures.

Yet another objective of the invention is to capture a portion of the combustion heat and convert it to other useful forms of energy such as combined heat and power. A corollary objective of the invention is to provide a burner that uses alternative fuel sources suitable for a commercially viable CHP system to provide energy at a cost independent of natural gas prices.

Since the invention may be built to a wider range of size and scale, besides industrial plants, another objective of the invention is to provide a smaller, portable CHP apparatus suitable for temporary use such as camping or to provide emergency residential back-up power and heat during a local or regional disaster, severe weather event, or other condition in which the municipal electrical grid has failed. In the aftermath of a destructive storm, low quality fuel sources may include timber from wrecked homes and downed trees and limbs, where a disaster relief organization may be able to use a small burner as part of a CHP system to generate heat and power at an aid station set up for refugees of the wreckage. In military situations, the traditional doctrine of supplying the protagonist forces from enemy's resources may mean using a similar type of portable burner or CHP system to derive heat and power from materials harvested from destroyed enemy structures.

Another use for a smaller and more portable CHP system is that usable combustible biomass is sometimes generated sporadically or seasonally within a region from activities such as harvesting, depredation, timber cutting, or clearing land for development.

Lastly, some plants actually thrive in air containing smoke and combustion products from burning certain plastics, and especially waste plastics, and thus another objective of the invention is that the burner may be used to burn such plastic wastes in a combustion process tuned for the development of this particularly beneficial exhaust.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The invention is an apparatus for oxygen-enriched burning, comprising a helical piston at an inclined angle to deliver fuel particles to a combustion zone. Heat developed from combustion may then be used for boiling, generating steam for heat or motive power or both, or applied to a heat engine such as a Stirling cycle engine. Pressure swing adsorption is used to separate oxygen from the air and feed it into the burner to achieve a hotter flame temperature that provides more complete burning and reduced pollutant production compared with alternative systems. Oxygen-enriched combustion has been shown to improve burner efficiency and lower fuel consumption input by as much as 10 percent for a given thermal requirement, while simultaneously reducing $NO_x$ emissions by 90 percent.

Combined heat and power (CHP) systems are being invented which capture a portion of heat of combustion and convert it to other forms of energy, typically electricity, motive power, or boilers for industrial or chemical processes, or to generate steam for heat or other industrial purposes. CHP systems that provide the benefits of CO2 fertilization have been implemented on industrial scales, and micro-CHP systems are available for home use. However, the majority of these systems use natural gas as their primary source of fuel. The burners in these systems are incapable of processing low-grade solid feedstock effectively.

Vertical feed mechanisms must prevent material from slipping below the inlet in the tube where they would be lost to an impeller mechanism operating within the tube.

Typical screw-feed mechanisms such as augers incur losses in conveying efficiency between 30% and 90% when operating on inclines, with more substantial losses seen when operating between 35° and 75° of incline. Attempts to reduce these efficiency losses include using reduced pitch screws of ½ or ⅔ the pitch normally used for horizontal or vertical applications, or using larger diameter tubes. Increasing the speed of the screw conveyor is also required, which also means additional horsepower is required to overcome gravity and bulk material fall back. A typical loss mechanism for augers rotating within inclined tubes is that the material within the blades of the auger and above the auger may rotate with the auger and not advance effectively in the axial direction of the auger. It would be desirable to invent an impeller mechanism capable of moving material at such an inclined angle without having to incur these efficiency losses or increased costs of physically larger machinery which require more power to operate.

Higher combustion temperature confers several advantageous: it enables more complete combustion, which means more energy extracted for the cost paid for the fuel and reduced environmental pollution from carbon monoxide, ozone, and the reduced costs of abatement of incomplete combustion products such as hydrocarbons, ash, and volatile organic compounds (VOCs.) Increasing the amount of oxygen in a combustion zone raises the temperature and enables more complete combustion. Pure oxygen or oxygen-enriched gas blends may be delivered to a combustion zone by piping and nozzles, and also by simpler methods such as supplying compressed air, or forced air, or blast air.

Another advantage of operating a burner at high combustion temperatures and in an oxygen enriched atmosphere is that lower quality sources of fuel may be consumed and also some waste products not usually considered as fuels may be burned before disposal, thus extracting useful energy which would otherwise be lost and also reducing bulk and weight of materials to be disposed of.

The introduction of oxygen into the cup of the burner of the invention creates an atmosphere in the spaces between the fuel particles which is typically around 85% oxygen, and combustion temperatures in excess of 4000° F. and sometimes in excess of 4500° F. Thus in the combustion zone there will be little or no NOx compounds created. All other materials are oxidized and are exhausted as gases. The gas delivered by the oxygen delivery tube may comprise at least 85% pure oxygen, and the oxygen in the gas may be concentrated to at least 85% by means of pressure swing adsorption. However, oxygen enrichment to at least 50% is sufficient to operate the invention and to achieve its benefits in at least some limited degrees.

The oxygen-enriched burner of the invention enables such extremely clean burning that the burner may be used inside green houses, a use which has high market potential, including greenhouse lighting and heating. When burning plastic pellets, the carbon dioxide and the water vapor released are prime products for produce grown in hydroponic greenhouses. Heat captured in water basins may be used to maintain a constant temperature in a hydroponic growing area. The carbon dioxide released allows plants to excel in growth. Electricity may be produced directly from the burner by the use of Sterling engine technology. This electricity may then be used for grow lights at night and for control circuits.

Figure 1:
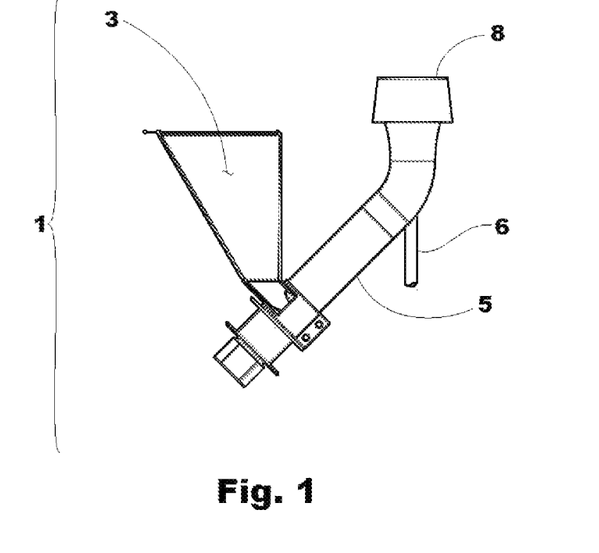
FIG. 1 shows an external, side view of components comprising a burner in accordance with the invention.

Referring now to the figures, FIG. 1 shows an external, side view of components comprising the invention, being an assembly [1] comprising a hopper [3,] a fuel feed tube [5] having a lumen oriented at an inclined angle, an oxygen delivery tube [6,] and a combustion cup [8.] The lumen or inner passage of the fuel feed tube communicates with the combustion cup. The invention will work for fuel feed tubes operating at inclined angles between 30° and 75° inclusive, and a best mode configuration has the inclined angle of the tube at about 45°, or between 40° and 50° inclusive. The lumen of the tube may also be referred to as a "barrel" similar to "barrel" as used for firearms.

Figure 2A:
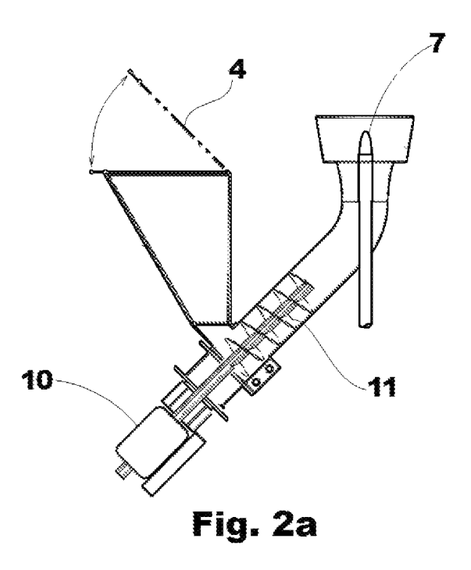
FIG. 2a shows a partial cutaway view of some of the components of FIG. 1 to expose and illustrate some internal components of the invention, including a helical piston shown in a retracted position.

FIG. 2a shows a partial cutaway view of some of the components of FIG. 1 to expose and illustrate some internal components of the invention, including an helical piston shown in a retracted position. The hopper is equipped with a hinged lid [4] and disposed within the lumen of the inclined fuel feed tube is a helical piston [11] driven by a motor [10] to which it is rotatably coupled. The oxygen delivery tube has a nozzle [7] or tip having at least one orifice. Flame propagates from burning fuel particles to charges of new fuel particles forced into the bottom of the cup by the piston. ('New' in this context of the specification refers to fuel particles not yet ignited and entering the combustion cup as driven by the piston.) Fuel particles are displaced radially outwards within the cup as new particles are fed from below. Burning fuel particles pushed out of the cup may continue to burn within the combustion chamber, and continue to contribute to the energy available for heat and power, although it is preferable to maintain fuel in proximity to the oxygen delivery tube and its nozzles.

Figure 2B:
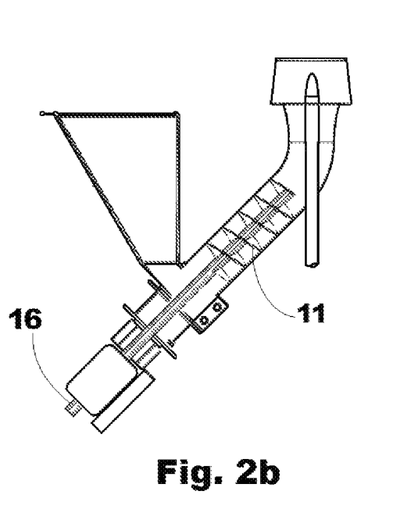
FIG. 2b shows another partial cutaway view but with a helical piston in an extended position.

FIG. 2b shows the helical piston [11] in an extended position. The piston shaft may include splines [16] so that it may translate axially within the motor or with respect to an armature of a motor to which it is rotatably coupled.

Although oxygen may be provided from any source, a best mode operation of the invention includes concentrating, collecting, or generating oxygen by pressure swing adsorption (PSA) or vacuum pressure swing adsorption (VPSA.) These processes operate on regular air and generally at ambient temperatures rather than cryogenic processes. In the process nitrogen is sequestered from air while allowing gaseous oxygen to pass through, thus concentrating the oxygen content of the remaining gas volume to about 85%, which is roughly 4½ times the oxygen content of air. After the concentration phase, a backflow phase removes the sequestered nitrogen from the adsorptive material to prepare for the next concentration phase. The nitrogen collected may be used for other industrial processes. Alternatively, oxygen concentrators for home-use oxygen therapy typically supply up to 90% oxygen, and may also be used as an economical apparatus for providing oxygen for small-sized embodiments of the invention.

Figure 3:
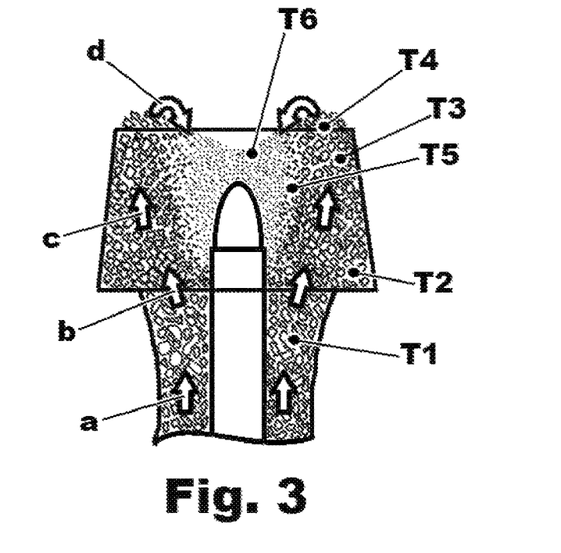
FIG. 3 shows a cross section of fuel particles at various temperatures within a burner cup in accordance with the invention.

FIG. 3 shows a cross section of fuel particles at various temperatures within a burner cup in accordance with the invention. Arrows [a,] [b,] [c,] and [d] illustrate the motion or flow of fuel chips as they emerge from the upper end of the inclined tube and enter the bottom of the combustion cup. A combustion cup in accordance with the invention includes a floor and a perimeter wall for retaining charges of solid fuel particles within the immediate vicinity of the oxygen delivery nozzle. Although the perimeter wall of the combustion cup may be cylindrical or an outward flaring cone as seen in FIG. 2a, in preferred embodiments the perimeter wall of the cup is a frustum of a cone or an inward-sloping conical surface as seen in all figures except FIGS. 2a and 5b. The inner-facing walls of the combustion cup may also consist only of inward-sloping surfaces as seen in this figure. Fuel chips fed into the combustion cup through a fuel-admitting central orifice in the floor of the cup spread outward until they reach the constraining interior surface of the inward-sloping wall of the combustion cup.

Combustion of the fuel takes place most vigorously in the immediate proximity of and directly above the fuel delivery nozzle. The solid portion of fuel particles shrink as they are consumed, and so the charge of fuel within the cup collapses in the middle as it is burned. Successive charges of material thus flow upward following arrows [a,] [b,] and [c,] until the turn on themselves toward the collapsing center of the fuel bed. This flow motion is toroidal and illustrated in this figure by arrows [d,] as the inward-sloping upper surface of the fuel bed forms a conical depression reminiscent of a volcanic crater.

Generous oxygenation greatly limits particles of incomplete combustion products, and the amount of ash produced is greatly reduced in comparison to conventional burners. What little ash and end products are produced are entrained upward by convection of the flame.

Estimates of fuel particle temperatures include that at points [T1,] [T2,] and [T3,] the fuel material is close to or only slightly elevated above the ambient temperature of air next to and below the combustion cup. Temperature at [T4] is equal to or greater than at point [T3,] and as material collapses toward the oxygen nozzle temperatures of around 1500° F. may be observed at point [T5] and combustion temperatures near the range of 4000° F. to 4500° F. may be observed at and above the oxygen nozzle at point [T6.]

Figure 4A:
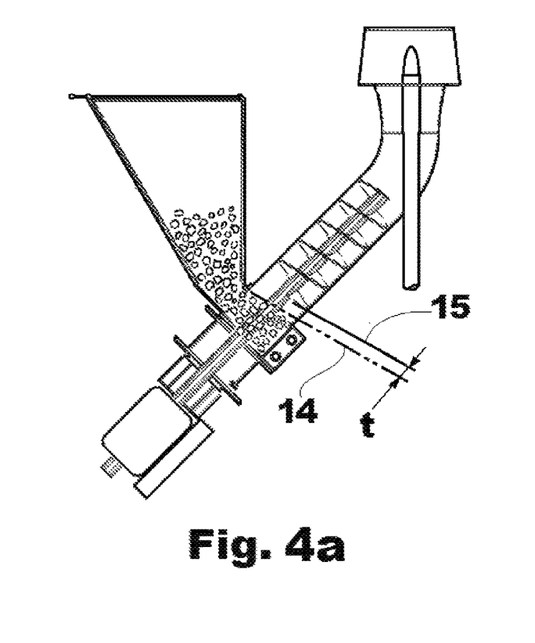
FIG. 4a shows a burner in accordance with the invention with its helical piston in an extended position.

FIG. 4a shows a burner in accordance with the invention with its helical piston in an extended position. When extended, fuel material falls into the tube from the hopper and assumes an angle of repose represented by the phantom line [14.] For a given material, the optimum angle of incline for the fuel feed tube would be perpendicular to the angle of repose of the fuel particles. However, other physical constraints or standards may require some other tube angle, such as 45°. The extension range or stroke of the helical piston should be adjusted so that its bottom end [15] of the helical piston departs from the angle of repose of incoming material from the hopper by as little as possible. In this illustration the excess excursion of the piston is the distance "t" as shown. A best mode operation of the invention occurs when distance "t" is zero or at least minimized. Otherwise, raising material with one operation only to have it fall behind the piston and be raised again by a second operation would contribute to cyclic inefficiency and wasted motion.

Figure 4B:
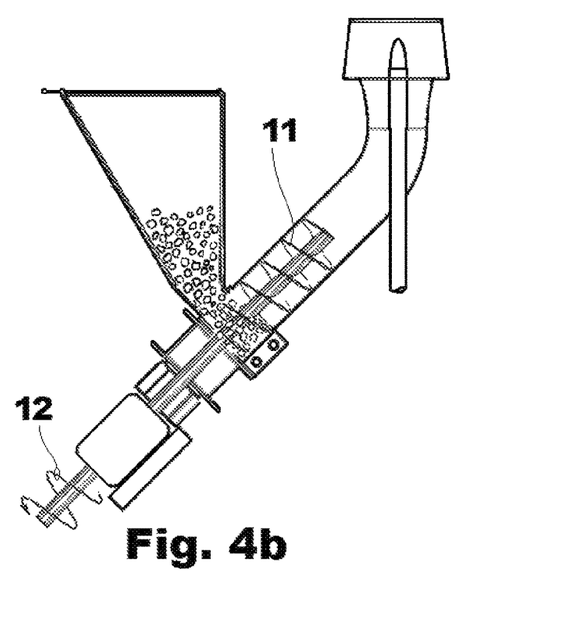
FIG. 4b shows a burner in accordance with the invention with its helical piston in a retracted position.

Next as shown in FIG. 4b, the helical piston [11] descends to its retracted position while the motor rotates at a predetermined rate so that, given its helical pitch, material in the inclined section of the tube remains substantially stationary during its downward or retracting motion, reminiscent of a wine corkscrew rotating and moving downward into a stationary cork in a wine bottle. The helical piston screws itself into the backfilled material as it descends as indicated by the helical motion arrow [12.] Preferably, the motor is run intermittently and holds the piston at a stop position except while the helical piston is moving downward from its extended position to its retracted position.

The helical piston then extends without rotation and pushes a charge of fuel particles up the tube without the disadvantages typically encountered by an axially stationary auger rotating within an inclined tube. In contrast to an auger, the inventive helical piston only rotates while descending axially to its retracted position.

The intermittent rotation of the helical piston may effected by controllable motors such as a stepper motor operably coupled to the extendable shaft, or rotating mechanical means may be used to intermittently engage the shaft. The extension and retraction mechanism for the piston is not shown in this figure although several means and mechanisms have been disclosed and described in FIGS. 5a and 5b of the parent application.

Successive non-rotating upstrokes of the helical piston push fresh fuel particles into the combustion cup from the center of its bottom so as to introduce a charge of unburned material into the cup. Since this material is cooler than the burning material, cooling of the cup and other burner components is effected by heat transfer from the hot components into the fresh charge of fuel particles as they arrive in the cup. This heat transfer extends the service life of the burner components by cooling them, and also serves to preheat the fuel particles.

Figure 5A:
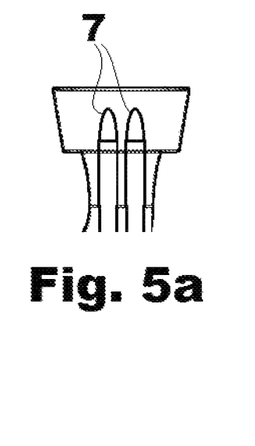
FIG. 5a shows an embodiment of the invention in which the combustion cup includes more than one oxygen delivery tube and nozzle.
Figure 5B:
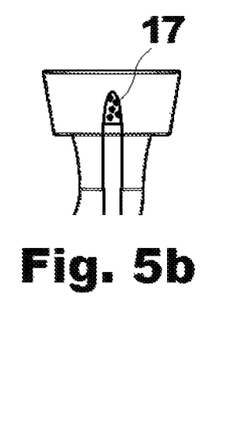
FIG. 5b shows an embodiment of the invention in which the oxygen delivery nozzle has a plurality of orifices.

Many different configurations or types of oxygen delivery tubes may be used in accordance with the invention. FIG. 5a shows an embodiment of the invention in which the combustion cup includes more than one oxygen delivery tube and nozzle [7.] These may be arranged in a radial array within the combustion cup or in other configurations. FIG. 5b shows an embodiment of the invention in which the oxygen delivery nozzle has a plurality of orifices [17] to direct incoming oxygen to all regions within the combustion cup. Of course, more than one such multiple-orifice nozzle or tip may be incorporated into the combustion cup.

For startup, the piston and fuel particle feed system is run until fuel particles fill the combustion cup. Then oxygen is turned on, and an ignition source is provided. Once oxygen is present leaving the orifice or nozzle at the tip of the oxygen delivery tube, a simple lit match may be dropped into the cup as an ignition source, and fuel combustion begins. Other ignition sources within the scope of the invention include electric arcing across a spark gap, or resistive wire such as nichrome wire heated by electric current to attain an ignition temperature. With the 85% oxygen concentration as delivered, combustion takes place at approximately 4500° F. The residual ash at this temperature vaporizes.

An alternative description of the components and operations of an embodiment of a burner within the scope of the invention is presented here: The device is made up of a barrel in which a fuel is moved at an inclined angle such as 45°, or an inclined angle within about ±20° of 45°, and the fuel is pushed by successive reciprocating motions of a helical piston until it arrives in a conical burn chamber, and the piston continues to push the material up the barrel into the conical burn chamber to about 4 inches past the top of the piston at an extended point of its stroke.

Figure 5C:
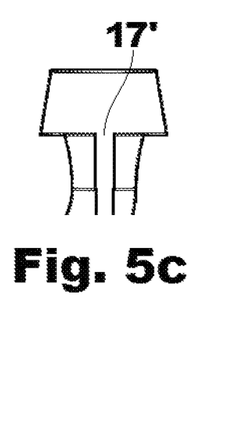
FIG. 5c shows an alternative embodiment of a combustion cup of a burner in accordance with the invention.

The conical burn chamber is a combustion cup as shown in FIG. 5c which includes an orifice at the center of its floor and an oxygen delivery tube [17'] in the center of this orifice, whereby an oxidizing gas is introduced. The nozzle is designed to cause the fuel to accumulate vertically along the side walls of the combustion cup. The piston in this embodiment includes a helical membrane or helical surface machined into the sides of the piston rod, which in a preferred embodiment is a modified buttress thread, and although other thread forms may work, they may not work as well.

The piston is driven by a cam mechanism by which the travel of the piston is preferably equal to the pitch of the helical surface. With the piston in an extended position, the cam engages a device that allows the piston to rotate as it is being retracted, and the movement of the piston is preferably adjusted so that one complete revolution of the piston coincides with the travel of one thread pitch of its helical surface or membrane.

An fuel inlet orifice is cut into the barrel so that as the piston extends the next charge of fuel material is allowed enter laterally into a breech volume at the bottom end of the swept volume of the piston. Several methods of charging the breech may be employed including gravity, air pressure introduced in the breech, and mechanical means such as a ram. One prototype used gravity but mechanisms providing higher forces were observed to operate more efficiently.

A piston is used because it delivers axial force great enough to force the fuel up the inclined tube and into the conical burn chamber far enough in a vertical direction so that the fuel comes to the top edge of the combustion cup, where the lip of the conical perimeter wall of the combustion cup causes the fuel to fall into the center of the burn chamber where oxidizer is introduced.

The cam may be driven by an electric motor or other device to provide rotary motion which is converted to reciprocating motion of the helical piston.

Figure 6:
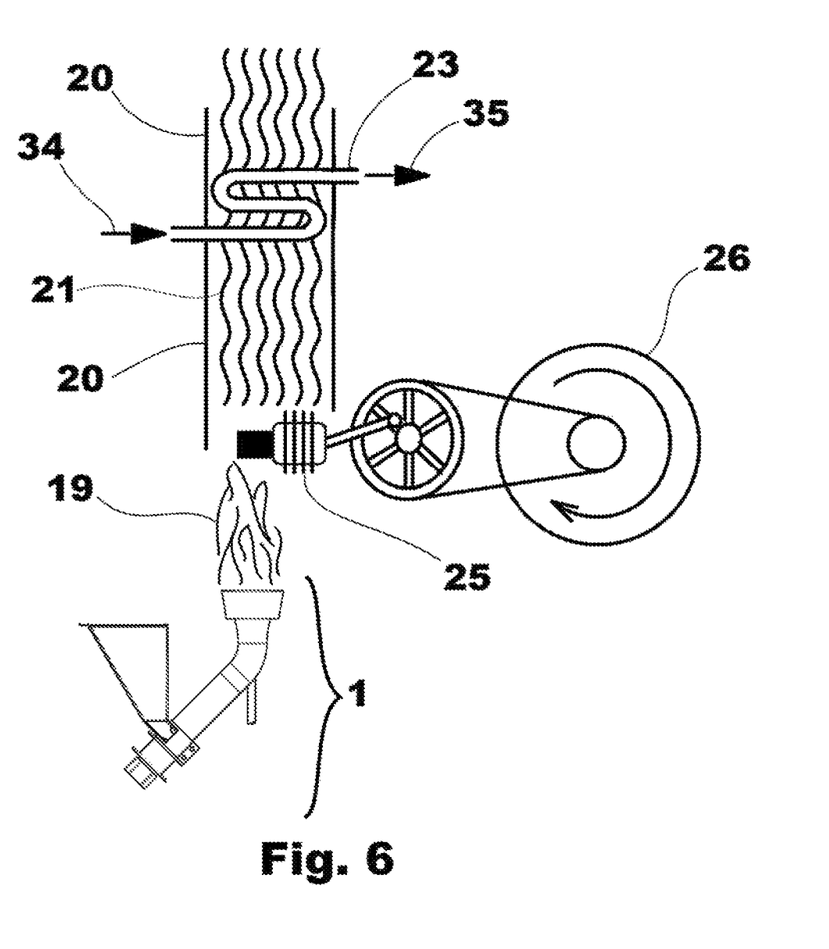
FIG. 6 shows a stylized combined heat and power (CHP) system including waste heat recovery.

FIG. 6 shows a stylized combined heat and power (CHP) system including co-generation or waste heat recovery. A heating unit comprising the inventive burner [1] may be used to power a device to produce electrical power. Part of this electrical energy may be stored in a battery. The electrical motor driving the cam may then be driven by the battery. The burner may also be used to heat the hot-side cylinder of an air-cycle engine [25.] The burner produces heat and flames [19] and flue gas [21] which is lead through a stack or funnel [20.] The flame is first applied to the hot-side cylinder head of an air-cycle engine such as a Stirling or Essex cycle hot air engine, or any heat engine that operates by cyclic compression and expansion of air or other working fluid at different temperatures, such that there is a net conversion of heat energy to mechanical work represented here as a rotating load [26] driven by the engine. The load may be a generator or alternator or belt driven machinery or the like.

Lastly in the figure, additional waste heat may be recovered using an intercooler [23] in the flue. A working fluid having low enthalpy (thermodynamic energy) enters the intercooler at an ingress [34] and acquires heat from the flue gas. The working fluid leaves the intercooler at an egress [35] in an energetic, higher enthalpy state. The recovered energy in the working fluid, such as its heat, pressure or velocity, may be transferred to other machinery for providing additional benefits such as space heating, heat for cooking or industrial processes, or mechanical power. If the working fluid enters as a liquid and leaves as a vapor, the intercooler functions as a flash boiler and the energetic vapor may be expanded through a turbine to provide mechanical power or to generate electricity. A particularly efficient and low-cost turbine is the Tesla style stacked disc turbine which has an advantage of being able to extract enough heat energy to partially condense the working fluid into droplets without incurring the kind of damage that droplets typically wreak inside a conventional bladed turbine.

At start up, the cam may be operated by a hand crank to bring fuel up into the burn chamber. A pressure swing adsorption (PSA) unit may also be operated by a hand crank to provide the initial gases required.

In a prototype, oxygen of different ratios were tested. A flame temperature of over 4000 degrees F. was observed. The fuel moving up the inside walls of the cone then acts as a cooling agent so that temperature of the perimeter wall of the combustion cup and of the feed tube and reciprocating piston are near the ambient temperature on the outside of the combustion cup. This these components may be fashioned out of materials which withstand these ambient temperatures rather than esoteric or expensive materials known to be able to withstand 4000° F. or higher temperatures.

With the foregoing understood, a process of using the inventive solid particle fuel burner to extract energy from bulk solid fuel particles may be summarized as a series of steps, beginning with and following the steps of:

a. Providing a solid particle fuel burner apparatus comprising a combustion cup having a floor and a perimeter wall having a rim, an oxygen delivery tube communicating with the combustion cup, a fuel feed barrel oriented at an inclined angle between 30° and 75° inclusive, with the barrel also communicating with the combustion cup, a piston disposed within the barrel, and the piston further comprising a helical surface and rotatably coupled to and slidably coupled to the fuel feed barrel. A motor is operably coupled to the piston for rotation the piston, and for powering means for sliding the piston between a retracted position and an extended position, with the fuel feed barrel further comprising a fuel inlet orifice located beneath the extended position of the piston.

The piston is then moved into its extended position, allowing a charge of solid fuel particles to enter the fuel feed barrel through the fuel inlet orifice beneath the piston, and then the piston is retracted to its retracted position while rotating said piston so that its helical surface screws into the charge of solid fuel particles. Extension, backfilling of fuel particles, and retraction of the piston for it to screw itself into the backfilled material is repeated until the combustion cup contains solid fuel particles, and preferably until the combustion cup is full or nearly full of fuel particles.

The burner is then lit by introducing an ignition source to the solid fuel particles in the combustion cup, such as a lit match or an electric arc. Oxygen is then introduced to the fuel and ignition flame so that burning propagates and proceeds through the fuel particles.

The reciprocating piston operates as frequently as necessary to continually charge the combustion cup with fresh fuel particles to replace fuel within the combustion cup as it is consumed by burning.

Optional aspects of the process for extracting energy using the inventive solid particle fuel burner include providing apparatus for delivering oxygen supplied by pressure swing adsorption or by vacuum pressure swing adsorption.

The heat developed by combustion may be directed to the hot cylinder or hot side portion of a cylinder of an air cycle engine. The air cycle engine may have one or more than one cylinder.

Fuel and oxygen may be supplied at rates sufficient to establish and maintain a combustion temperature of at least 4000° F.

Lastly as described in FIG. 3, the combustion cup may preferably comprise an inward-sloping conical surface which establishes a toroidal flow of fuel particles as they rise along the perimeter of the cup and collapse inward toward the nozzle or exit orifice of the oxygen delivery tube. As seen in FIG. 6, an intercooler may also be provided with a working fluid available to pass through it so that by directing combustion exhaust to heat the intercooler, combustion energy may be transferred to the working fluid and utilized to deliver heat, energy, or power to other machinery or other spaced or objects to be heated.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. An apparatus for oxygen-enriched burning, comprising a combustion cup comprising
   a floor having a central fuel-admitting orifice,
   a perimeter wall consisting of at least one inward-sloping surface, and
   an oxygen delivery tube centrally located within said fuel-admitting orifice,
   a fuel feed tube having a lumen oriented at an inclined angle between 30° and 75° inclusive, said lumen communicating with said fuel-admitting orifice,
   a helical piston disposed within said lumen, said helical piston rotatably coupled to and slidably coupled to said fuel feed tube,
   a motor operably coupled to said helical piston for rotation thereof, and
   means for sliding said helical piston between a retracted position and an extended position.

2. The apparatus of claim 1, wherein said inclined angle is between 40° and 50° inclusive.

3. The apparatus of claim 1, wherein said motor is a stepper motor.

4. The apparatus of claim 1, wherein a shaft of said motor further comprises splines.

5. The apparatus of claim 1, wherein said inward-sloping surface is an inward-sloping conical surface.

6. The apparatus of claim 1, wherein said oxygen delivery tube is connected to an oxygen concentrator.

7. The apparatus of claim 6, wherein said perimeter wall of said combustion cup further comprises an inward-sloping conical surface.

8. The apparatus of claim 6, wherein said oxygen concentrator includes pressure swing adsorption.

9. The apparatus of claim 6, wherein said oxygen concentrator includes vacuum pressure swing adsorption.

10. The apparatus of claim 6, wherein said oxygen delivery tube contains a gas comprising at least 50% oxygen.

11. The apparatus of claim 6, further comprising a hopper attached to said fuel feed tube.

12. The apparatus of claim 1, further comprising means for spark gap ignition.

13. The apparatus of claim 1, wherein oxygen delivered through said oxygen delivery tube is supplied by pressure swing adsorption.

14. The apparatus of claim 1, wherein oxygen delivered through said oxygen delivery tube is supplied by vacuum pressure swing adsorption.

15. The apparatus of claim 1, wherein said oxygen delivery tube is one from among a radial array of oxygen delivery tubes.

\* \* \* \* \*